UNITED STATES PATENT OFFICE.

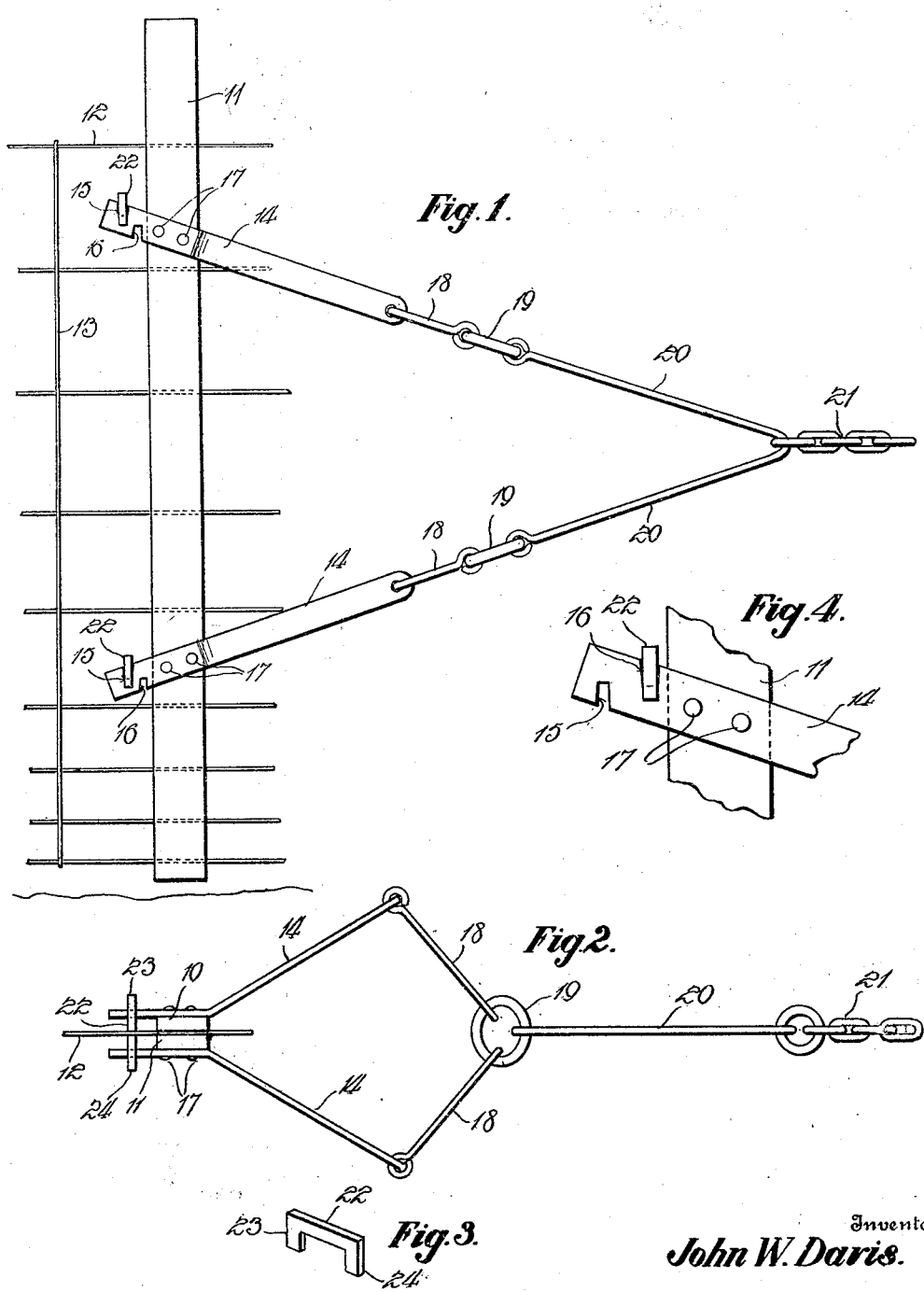

JOHN W. DAVIS, OF PERDUE HILL, ALABAMA.

WIRE-FENCE CLAMP.

955,254.  Specification of Letters Patent.  Patented Apr. 19, 1910.

Application filed August 13, 1909. Serial No. 512,683.

*To all whom it may concern:*

Be it known that I, JOHN W. DAVIS, a citizen of the United States, residing at Perdue Hill, in the county of Monroe, State of Alabama, have invented certain new and useful Improvements in Wire-Fence Clamps; and I do hereby declare the following to be a full, clear, and exact description of the invention, such as will enable others skilled in the art to which it appertains to make and use the same.

This invention relates to clamping devices for use in stretching wire fence structures, and has for one of its objects to improve the construction and increase the efficiency and utility of devices of this character.

With this and other objects in view, the invention consists in certain novel features of construction as hereafter shown and described and then specifically pointed out in the claims, and in the drawings illustrative of the preferred embodiment of the invention, Figure 1 is a side elevation of the improved device applied. Fig. 2 is a plan view of the same. Fig. 3 is a perspective view of one of the coupling links, enlarged. Fig. 4 is a detail view, enlarged, illustrating the fact that the improved implement is adapted for use in either position.

The improved device may be applied to fence structures of various forms, but is more particularly applicable to fence structures which are manufactured in webs or panels, and attached to posts by stretching bodily, or simultaneously stretching all of the strand wires of the fence structure.

The improved device comprises two clamp bars 10—11 arranged side by side upon opposite sides of the fence structure at the point where the strain is to be applied. For the purpose of illustration a portion of a fence structure is represented with the usual strand wires 12 and stay wires 13. The bars 10—11 are applied to the strand wires 12 at the opposite sides thereof, as shown.

Attached to the bars 10—11 at opposite sides and at spaced points thereon are straining arms, and as these arms are precisely alike, the same reference character 14 will be employed for each. Two of the arms are arranged upon the member 10 at equal distances above and below its center, and two of the arms are likewise connected to the member 11 opposite the first mentioned arms. By this means the arms are arranged in oppositely related pairs. The upper pair of the arms are arranged to diverge outwardly and downwardly, while the lower pair of arms are arranged to diverge outwardly and upwardly.

The arms 14 extend for a distance forwardly of the members 11—12 and each is provided with notches 15—16 in its opposite edges, as shown. The members 14—15 are preferably riveted or otherwise secured as at 17 to the bars 10—11, as shown.

The diverging terminals of the arms 14 are apertured, and connected in these apertures are links 18, each pair of links being coupled at their free ends to a ring or loop 19. Connected into the loops or rings is a V-shaped rod 20, as shown and coupled to the V-shaped rod is a draft element, preferably in the form of a chain 21, by which the strain is applied in any suitable manner.

Fitting in the recesses 15—16 which for the time being are located upwardly are links 22 having depending terminals 23—24, the links serving to lock the members 14 together and preventing outward movement thereto when the strain is applied. By this simple means it will be obvious that when the members 10—11 are located upon opposite sides of the fence structure and strain applied to the member 21, the outwardly diverging members 14 will be drawn inwardly toward each other and thus apply a strong grip to the fence wires, the links 22 effectually preventing outward movement of the short ends of the arms 14, as will be obvious.

It will thus be noted that a very simple and effective device is produced, which may be readily applied to fence structures of various kinds, and to fence structures having strand wires of various sizes without structural changes of any kind. By providing two sets of the recesses 15—16 it will be a matter of indifference which end of the members 10—11 is presented upwardly, as the two sets of the recesses provide for the insertion of the links 22 from either side, as will be understood. The provision of the two sets of the recesses is thus an important feature of the invention and increases its utility and efficiency without material increase of expense or weight.

The members 10—11 will preferably be of wood, while the remaining portions of the device will be of metal, but the members 10—11 may also be of metal, if preferred.

What is claimed is:—

1. An implement of the class described, comprising clamp bars arranged side by side, clamp arms connected to the clamp bars and diverging therefrom at one side of the bars and provided with transverse recesses at the opposite sides of the bars, a link having depending terminals and fitting in the recesses of the clamp arms, and means for applying strain to the diverging portions of the arms.

2. An implement of the class described, comprising clamp bars arranged side by side, clamp arms arranged in pairs and connected to the clamp bars and diverging therefrom at one side of the bars and provided with transverse recesses at the opposite sides of the bars, a link having depending terminals and fitting in the recesses of the clamp arms, draft rods connected to each pair of said arms, links coupled to each pair of said rods, a V-shaped rod connected at its terminals to said links, and a draft appliance connected to said V-shaped rod.

In testimony whereof, I affix my signature, in presence of two witnesses.

JOHN W. DAVIS.

Witnesses:
 DAVID DAVIS,
 J. W. WILKINSON.